US012480341B2

(12) United States Patent
Saito

(10) Patent No.: US 12,480,341 B2
(45) Date of Patent: Nov. 25, 2025

(54) LOCK DEVICE

(71) Applicant: PIOLAX, INC., Kanagawa (JP)

(72) Inventor: Jun Saito, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 137 days.

(21) Appl. No.: 18/010,679

(22) PCT Filed: Jun. 23, 2021

(86) PCT No.: PCT/JP2021/023837
§ 371 (c)(1),
(2) Date: Dec. 15, 2022

(87) PCT Pub. No.: WO2021/261530
PCT Pub. Date: Dec. 30, 2021

(65) Prior Publication Data

US 2023/0304333 A1 Sep. 28, 2023

(30) Foreign Application Priority Data

Jun. 24, 2020 (JP) ................................ 2020-109177

(51) Int. Cl.
*E05B 83/30* (2014.01)
*B60R 7/06* (2006.01)

(52) U.S. Cl.
CPC ................ *E05B 83/30* (2013.01); *B60R 7/06* (2013.01)

(58) Field of Classification Search
CPC ........ E05B 83/30; E05B 13/10; E05B 63/242; E05B 1/0038; E05B 5/00; E05C 9/043
See application file for complete search history.

(56) References Cited

U.S. PATENT DOCUMENTS 5,688,000 A * 11/1997 Dolman .................... E05C 9/20 292/DIG. 64
6,669,243 B2 * 12/2003 Katoh ....................... B60R 7/06 292/DIG. 37

(Continued)

FOREIGN PATENT DOCUMENTS

CN 104145071 A 11/2014
JP 2011-252321 A 12/2011

(Continued)

OTHER PUBLICATIONS

Jul. 20, 2021, International Search Report issued for related PCT Application No. PCT/JP2021/023837.

(Continued)

*Primary Examiner* — Christine M Mills
*Assistant Examiner* — Faria F Ahmad
(74) *Attorney, Agent, or Firm* — Paratus Law Group, PLLC

(57) ABSTRACT

A lock device attached to a stationary body so that an opening and closing body is locked in a closed state with respect to the stationary body includes a driving member that is driven in response to movement of an operation member, and a rod movable in a longitudinal direction. The driving member includes a coupling portion coupled to the rod. The rod includes a lock portion engageable with and disengageable from a lock hole of the opening and closing body, and a holding portion holding the coupling portion so that the coupling portion is slidable in a moving direction of the rod. When the rod is moved in a lock releasing direction in which lock of the lock portion is released by the driving member, the holding portion and the coupling portion move in the lock releasing direction.

5 Claims, 7 Drawing Sheets

(56) References Cited

U.S. PATENT DOCUMENTS

| | | | | |
|---|---|---|---|---|
| 7,048,311 | B2 * | 5/2006 | Sawatani | E05B 83/30 292/32 |
| 7,455,333 | B2 * | 11/2008 | Ookawara | E05B 83/30 292/34 |
| 8,403,374 | B2 * | 3/2013 | Shimizu | E05C 9/04 292/141 |
| 9,074,389 | B2 * | 7/2015 | Shimizu | E05D 1/04 |
| 9,121,206 | B2 * | 9/2015 | Shimizu | E05C 9/042 |
| 9,556,654 | B2 * | 1/2017 | Fukumoto | E05B 83/28 |
| 10,053,019 | B2 * | 8/2018 | Hodgson | E05B 1/0038 |
| 10,081,970 | B2 * | 9/2018 | Aselage | E05B 83/30 |
| 10,132,108 | B2 * | 11/2018 | Shimizu | E05B 63/248 |
| 10,738,511 | B2 * | 8/2020 | Nakasone | E05C 9/04 |
| 10,941,594 | B2 * | 3/2021 | Liu | E05B 83/30 |
| 11,066,855 | B2 * | 7/2021 | Komatsu | E05C 9/041 |
| 11,261,626 | B2 * | 3/2022 | Kulicki | E05C 9/046 |
| 11,492,824 | B2 * | 11/2022 | Flaute | B60R 7/06 |
| 2004/0189012 | A1 * | 9/2004 | Katou | B60R 7/06 292/34 |
| 2005/0104380 | A1 * | 5/2005 | Cho | E05B 83/30 292/33 |
| 2005/0104399 | A1 * | 5/2005 | Cho | E05B 83/30 296/37.12 |
| 2006/0055196 | A1 | 3/2006 | Yamada | |
| 2006/0267364 | A1 * | 11/2006 | Katagiri | E05B 83/30 296/37.12 |
| 2007/0200361 | A1 * | 8/2007 | Najima | E05C 3/24 292/216 |
| 2007/0205627 | A1 * | 9/2007 | Ishiguro | E05B 83/30 296/100.1 |
| 2007/0289345 | A1 * | 12/2007 | Kozuka | E05B 83/30 70/237 |
| 2011/0174027 | A1 * | 7/2011 | Ookawara | E05C 9/047 70/159 |
| 2015/0028602 | A1 | 1/2015 | Shimizu et al. | |
| 2015/0152671 | A1 | 6/2015 | Nakasone | |
| 2017/0044803 | A1 * | 2/2017 | Nakasone | E05B 77/36 |
| 2018/0328087 | A1 * | 11/2018 | Nakasone | E05C 9/047 |
| 2018/0347241 | A1 * | 12/2018 | Nakasone | E05C 9/04 |
| 2019/0040663 | A1 * | 2/2019 | Ruzich | B60R 7/04 |
| 2019/0048626 | A1 | 2/2019 | Shimizu et al. | |
| 2020/0308881 | A1 * | 10/2020 | Nakasone | E05C 9/04 |
| 2021/0095498 | A1 * | 4/2021 | Kondo | E05C 9/043 |
| 2022/0161731 | A1 * | 5/2022 | Tamaki | B60R 7/06 |
| 2022/0290472 | A1 * | 9/2022 | Woo | E05B 77/06 |
| 2023/0003060 | A1 * | 1/2023 | Nakasone | E05C 9/04 |
| 2023/0313577 | A1 * | 10/2023 | Ishii | E05C 9/10 292/33 |

FOREIGN PATENT DOCUMENTS

| | | | |
|---|---|---|---|
| JP | 2017-222231 | A | 12/2017 |
| WO | WO 2006/030610 | A1 | 3/2006 |
| WO | WO 2013/129100 | A1 | 9/2013 |
| WO | WO 2013/187388 | A1 | 12/2013 |

OTHER PUBLICATIONS

Jul. 20, 2021, International Search Opinion issued for related PCT Application No. PCT/JP2021/023837.

Jun. 14, 2022, International Preliminary Report on Patentability issued for related PCT Application No. PCT/JP2021/023837.

Feb. 21, 2025, Chinese Office Action issued for related CN Application No. 202180043516.2.

* cited by examiner

LOCK DEVICE

CROSS REFERENCE TO PRIOR APPLICATION

This application is a National Stage Patent Application of PCT International Patent Application No. PCT/JP2021/023837 (filed on Jun. 23, 2021) under 35 U.S.C. § 371, which claims priority to Japanese Patent Application No. 2020-109177 (filed on Jun. 24, 2020), which are all hereby incorporated by reference in their entirety.

TECHNICAL FIELD

The present invention relates to a lock device capable of locking an opening and closing body, which can open and close an opening of a stationary body, in a closed state.

BACKGROUND ART

Patent Literature 1 discloses a lock device that is attached to a glove box and locks a lid in a closed state. The lock device includes two link rods, a rotor that couples the link rods to each other, a housing that supports an end portion side of one of the link rods, and a pusher that is supported by the housing. The link rod is provided with a hook portion that engages with and locks the lid.

CITATION LIST

Patent Literature

Patent Literature 1: WO 2013/129100

SUMMARY OF INVENTION

Technical Problem

In the lock device attached to the stationary body, movement of the rod is less likely to be restricted by the opening and closing body than in a case where the lock device is accommodated inside the opening and closing body, and therefore, it is preferable to configure the lock device so as to prevent backlash, but in this case, there is a concern that operability at the time of unlocking may be affected.

An object of the present invention is to provide a technique of preventing rattling of a rod while maintaining operability at the time of releasing a lock in a lock device attached to a stationary body.

Solution to Problem

In order to solve the above problem, an aspect of the present invention relates to a lock device attached to a stationary body having an opening so that an opening and closing body configured to open and close the opening is locked in a closed state with respect to the stationary body, the lock device including: a driving member configured to be driven in response to movement of an operation member receiving an operation of a user; and a rod configured to be movable in a longitudinal direction. The driving member includes a coupling portion coupled to the rod. The rod includes a lock portion configured to be engageable with and disengageable from a lock hole of the opening and closing body, and a holding portion holding the coupling portion so that the coupling portion is slidable in a moving direction of the rod. When the rod is moved in a lock releasing direction in which lock of the lock portion is released by driving of the driving member in response to the operation of the user, the holding portion and the coupling portion are configured to move in the lock releasing direction.

Advantageous Effects of Invention

According to the present invention, it is possible to provide a technique of preventing rattling of a rod while maintaining operability at the time of releasing a lock in a lock device attached to a stationary body.

DESCRIPTION OF EMBODIMENTS

Figure 1:
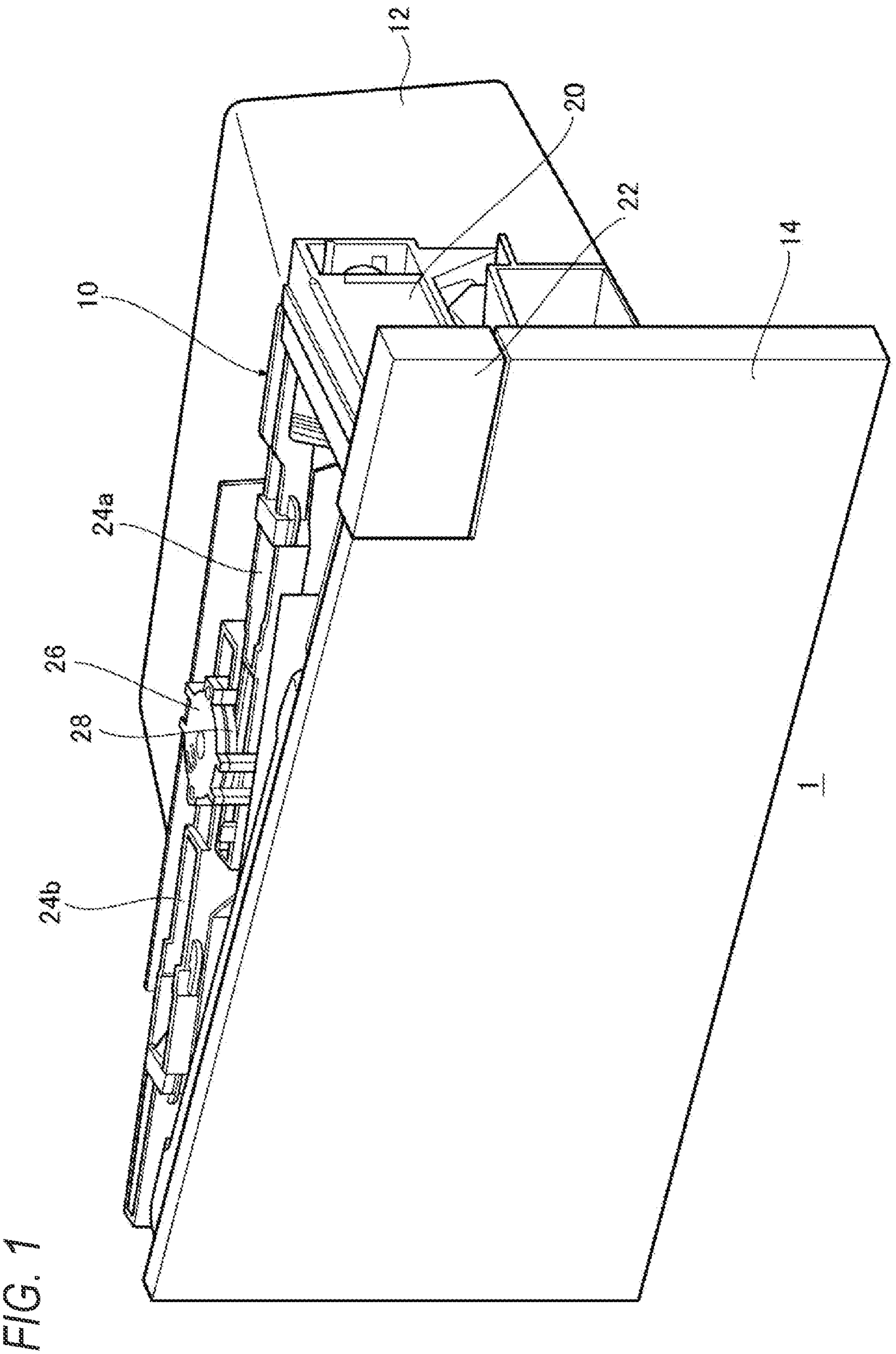
FIG. 1 is a perspective view of a glove box according to an embodiment.

FIG. 1 is a perspective view of a glove box 1 according to an embodiment. The glove box 1 includes a lock device 10, a stationary body 12, and an opening and closing body 14. The glove box 1 is provided in an instrument panel of a vehicle.

The stationary body 12 is formed with a recess and is fixed to the instrument panel. An opening is provided in the recess of the stationary body 12. The stationary body 12 may be integrated with the instrument panel. The opening and closing body 14 is provided so as to be rotatable with respect to the stationary body 12, and opens and closes the opening of the stationary body 12 by rotation.

The lock device 10 can lock the opening and closing body 14 in a state where the opening and closing body 14 closes the opening of the stationary body 12. As a result, the opening and closing body 14 is maintained in a state where the opening is closed. As shown in FIG. 1, the lock device 10 is attached to the stationary body 12. Therefore, the opening and closing body 14 can be made thinner than in a case where the lock device 10 is provided inside the opening and closing body 14. On the other hand, it is necessary to prevent movement of the lock device 10 since the movement is not restricted by the opening and closing body 14.

The lock device 10 includes a base member 20, an operation member 22, a first rod 24*a*, a second rod 24*b*, a holding member 26, a rotor member 28, a driving member, and a spring member. Each member of the lock device 10 will be described with reference to new drawings.

Figure 2A:
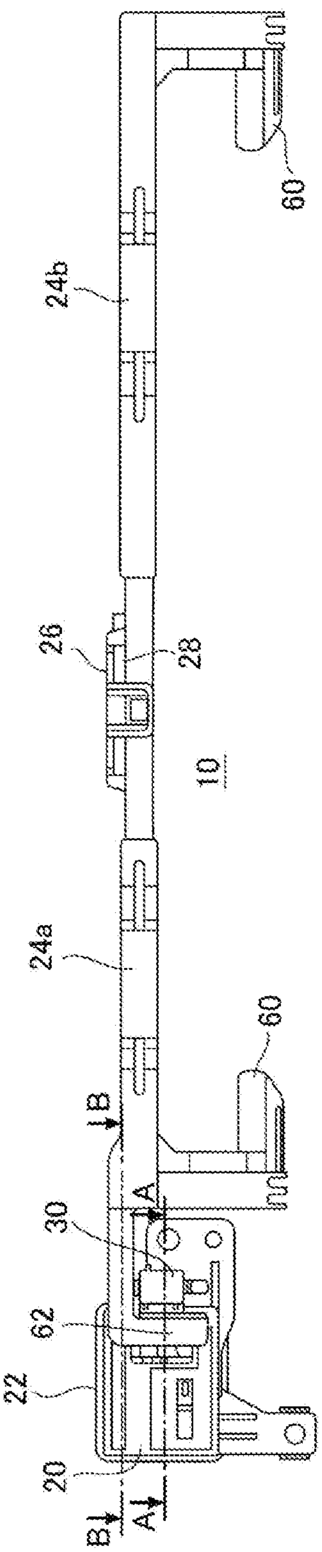
FIG. 2A is a rear view of a lock device.
Figure 2B:
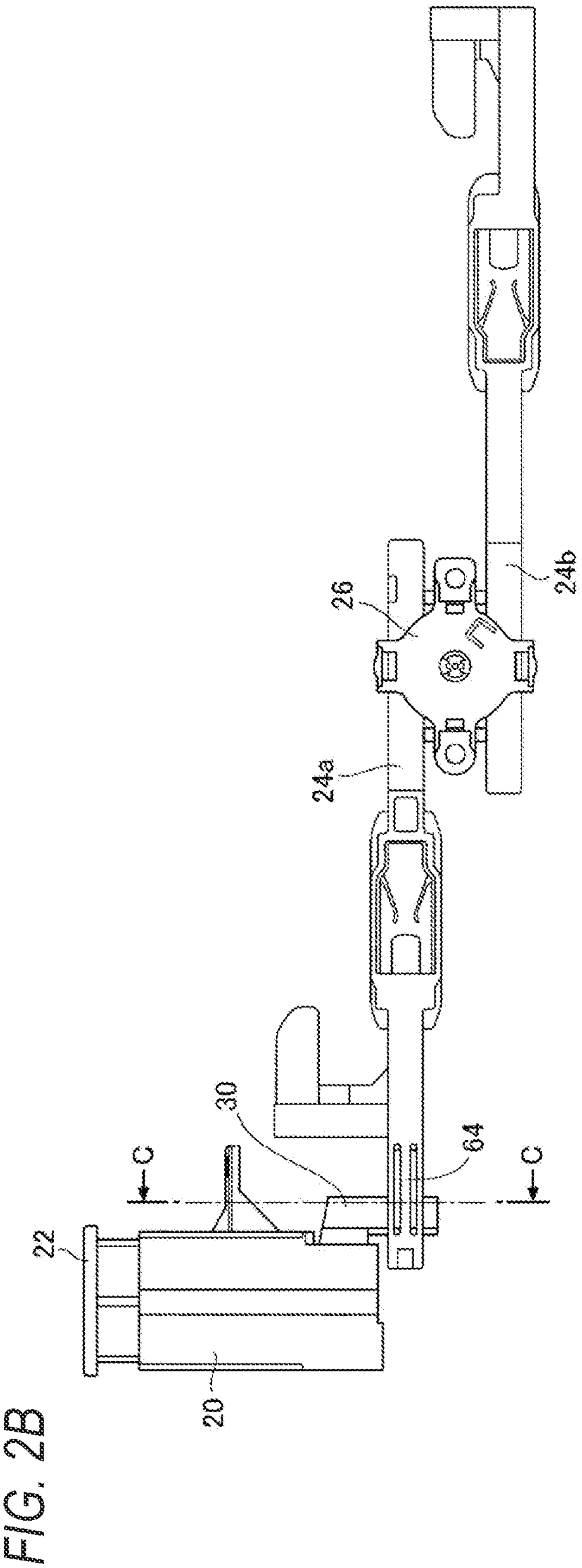
FIG. 2B is a top view of the lock device.

FIG. 2A is a rear view of the lock device 10, and FIG. 2B is a top view of the lock device 10. The base member 20 slidably accommodates the operation member 22 and the driving member 30. The operation member 22 can be operated by a user and is exposed from the stationary body 12 and the opening and closing body 14. In FIG. 1, the base member 20 and the operation member 22 are disposed at an upper right portion of the opening and closing body 14. Alternatively, the base member 20 and the operation member 22 may be disposed at an upper left portion of the opening and closing body 14.

When the operation member 22 receives a push operation from the user, the operation member 22 slides to a back side of the base member 20 and moves the driving member 30. The driving member 30 moves in conjunction with the operation member 22. The driving member 30 is slidably coupled to the first rod 24*a*.

The first rod 24*a* and the second rod 24*b* are formed in a longitudinal shape, and are movable in a longitudinal direction. That is, a moving direction of the first rod 24*a* and the second rod 24*b* is aligned with the longitudinal direction. The longitudinal direction of the first rod 24*a* and the second rod 24*b* is substantially parallel to a width direction of the opening of the stationary body 12. Each of the first rod 24*a* and the second rod 24*b* has a lock portion 60 that can be engaged with and disengaged from a lock hole of the opening and closing body 14. The first rod 24*a* includes a holding portion 64 that holds a coupling portion of the driving member 30. The first rod 24*a* is moved by the driving member 30, and the second rod 24*b* moves in conjunction with the movement of the first rod 24*a* via the rotor member 28.

The rotor member 28 is coupled with the first rod 24*a* and the second rod 24*b*, and when the rotor member 28 rotates, the first rod 24*a* and the second rod 24*b* move. The holding member 26 is provided so that the rotor member 28 is not disengaged from the first rod 24*a* and the second rod 24*b*. The holding member 26 is fixed to the stationary body 12 and guides the movement of the first rod 24*a* and the second rod 24*b*. The rotor member 28 is provided with a biasing member (not shown) that biases the first rod 24*a* and the second rod 24*b* in a direction in which the lock portions 60 of the first rod 24*a* and the second rod 24*b* are locked. The biasing member biases the rotor member 28 so as to rotate in a locking direction. As a result, the first rod 24*a* and the second rod 24*b* moved in a lock releasing direction can return to lockable positions.

Figure 3B:
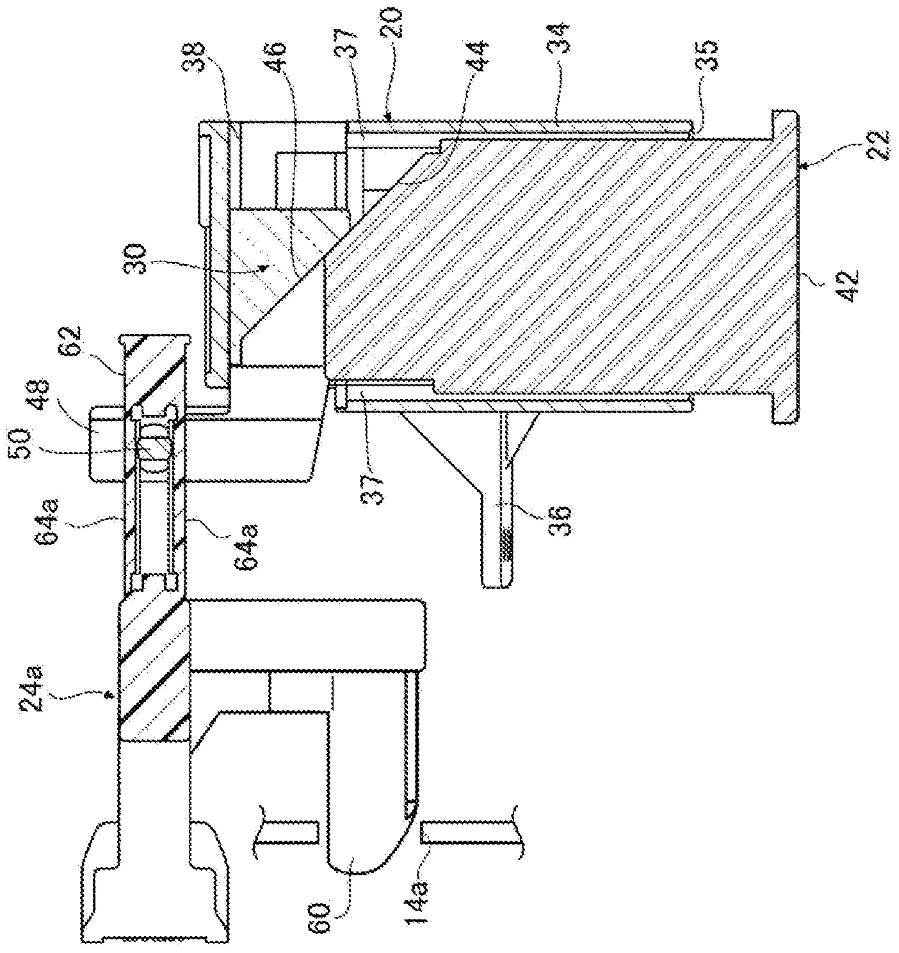
FIGS. 3A and 3B are partial cross-sectional views of the lock device.
Figure 3A:
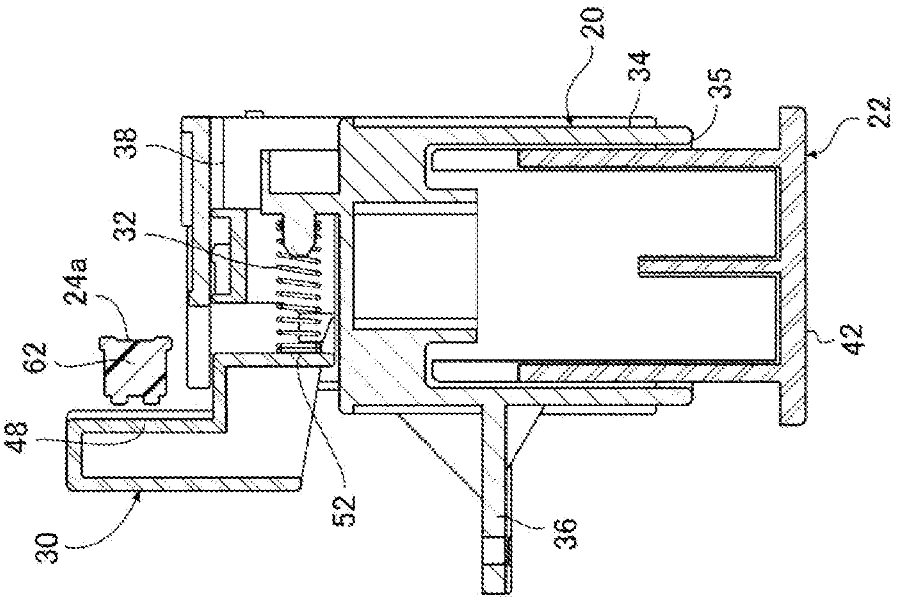
Figure 4:
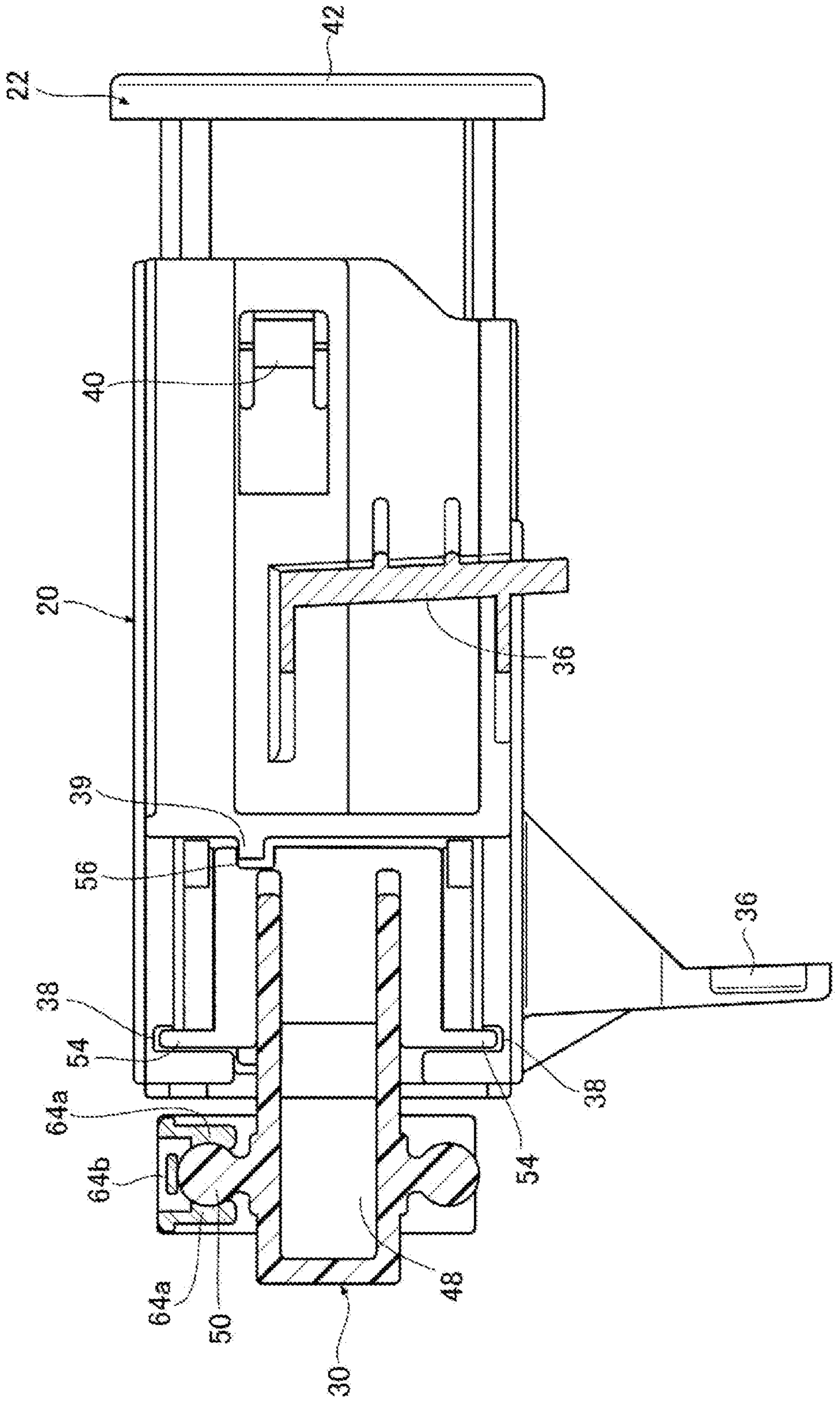
FIG. 4 is a cross-sectional view taken along a line C-C of the lock device shown in FIG. 2B.

FIGS. 3A and 3B are partial cross-sectional views of the lock device 10. FIG. 3A is a cross-sectional view taken along a line A-A of the lock device 10 shown in FIG. 2A, and FIG. 3B is a cross-sectional view taken along a line B-B of the lock device 10 shown in FIG. 2A. FIG. 4 is a cross-sectional view taken along a line C-C of the lock device 10 shown in FIG. 2B.

The base member 20 includes an accommodation portion 34, an insertion hole 35, an attachment portion 36, a slide guide portion 37, first guide portions 38, a second guide portions 39, and a retaining portion 40. The attachment portion 36 is formed so as to protrude from an outer surface of the base member 20, and is used for screwing to the stationary body 12.

The accommodation portion 34 is formed in a box shape, and accommodates a part of the operation member 22 and a part of the driving member 30. The insertion hole 35 is formed in the accommodation portion 34, and the operation member 22 is inserted in from the insertion hole 35. The slide guide portion 37 is formed in a groove shape and guides the slide of the operation member 22.

The first guide portions 38 and the second guide portion 39 extend in a direction orthogonal to the slide guide portion 37, and guide the slide of the driving member 30. As shown in FIG. 4, the first guide portions 38 are formed in a groove shape, and the second guide portion 39 is formed in a protruding shape. FIG. 4 shows the retaining portion 40 formed on a side surface of the base member 20. The retaining portion 40 is an elastic claw and restricts the operation member 22 from coming off the base member 20.

The operation member 22 includes an operation input portion 42 and a pushing portion 44. The operation input portion 42 is formed at one end of the operation member 22, and the pushing portion 44 is formed at the other end of the operation member 22. The operation input portion 42 is exposed to the outside and receives an operation input by the user. The pushing portion 44 is formed as an inclined surface inclined with respect to a sliding direction of the operation member 22.

The driving member 30 includes a sliding surface 46, a contact portion 48, a coupling portion 50, a spring receiving portion 52, first engaging portions 54, and a second engaging portion 56. As shown in FIG. 3B, the sliding surface 46 is inclined at the same angle as the pushing portion 44 and slides on the pushing portion 44. The driving member 30 is pushed by the operation member 22 and is movable in a direction orthogonal to the operation member 22.

The pair of first engaging portions 54 is formed in a protruding shape and engaged with the pair of first guide portions 38, and the second engaging portion 56 is formed in a groove shape and engaged with the second guide portion 39. By these engagements, the driving member 30 stably slides. A protruding-recessing relationship between the first engaging portion 54 and the first guide portion 38 and a protruding-recessing relationship between the second engaging portion 56 and the second guide portion 39 may be reversed.

The contact portion 48 protrudes from the base member 20, extends in a direction orthogonal to the longitudinal direction of the first rod 24*a* as shown in FIG. 3B, and intersects the first rod 24*a* in a top view. The contact portion 48 can come into contact with a receiving portion 62 of the first rod 24*a*.

As shown in FIG. 4, the coupling portion 50 is formed so as to protrude from the contact portion 48, and is formed in a so-called ball joint with a spherical shape. The coupling portion 50 is coupled to the first rod 24*a*. The spring receiving portion 52 receives a biasing force from the spring member 32.

As shown in FIG. 3A, the spring member 32 is supported by the base member 20 and biases the driving member 30. The spring member 32 biases the operation member 22 receiving the push operation so as to return the operation member 22 to an original position. The driving member 30 and the operation member 22 are integrally moved by the spring member 32.

The lock portion 60 of the first rod 24*a* can enter and exit a lock hole 14*a* of the opening and closing body 14 shown in FIG. 3B. A state in which the lock portion 60 enters the lock hole 14*a* is referred to as a locked state, and a state in which the lock portion 60 exits from the lock hole 14*a* is referred to as a lock released state. The movement of the first rod 24*a* in a direction in which the lock portion 60 enters the lock hole 14*a* is referred to as the movement in the locking direction, and the movement of the first rod 24*a* in a direction in which the lock portion 60 exits from the lock hole 14*a* is referred to as the movement in the lock releasing direction.

The lock portion 60 is formed so as to protrude in an L shape from a rod-shaped main body of the first rod 24*a*, and a tip end of the lock portion 60 faces the second rod 24*b* side.

The receiving portion 62 receives an operation force of the user from the contact portion 48, and moves the first rod 24*a* in the lock releasing direction. The receiving portion 62 is positioned at an end portion of the first rod 24*a*, is bent in a direction orthogonal to the longitudinal direction at the end portion of the first rod 24*a*, and is positioned on a rear end portion side of the first rod 24*a* with respect to the lock portion 60 and the holding portion 64. The receiving portion 62 is positioned on a rearmost end side in the longitudinal direction of the first rod 24*a*, and in another example, another configuration may be further provided on a rear end side of the receiving portion 62.

As shown in FIG. 4, the holding portion 64 holds the coupling portion 50 so as to be slidable in the moving direction of the first rod 24*a*. Clamping portions 64*a* are formed in a pair in a plate shape, clamp the coupling portion 50 to prevent rattling of the operation member 22 in the sliding direction, and are caught by the coupling portion 50 to prevent the coupling portion 50 from being detached from the holding portion 64. An elastic contact portion 64*b* is in elastic contact with a tip end of the coupling portion 50, and prevents rattling of the first rod 24*a*. Accordingly, since it is not necessary to provide another member for preventing the rattling of the first rod 24*a*, the number of components can be reduced.

When the lock portion 60 enters the lock hole 14*a*, the lock portion 60 comes into contact with the opening and closing body 14 and moves backward. Since the coupling portion 50 and the holding portion 64 are slidably coupled to each other, the first rod 24*a* can move backward separately from the driving member 30. Therefore, when the lock portion 60 comes into contact with the opening and closing body 14 and moves in the lock releasing direction in closing the opening and closing body 14, the holding portion 64 slides with respect to the coupling portion 50 in a state of being coupled to the coupling portion 50.

Accordingly, since the first rod 24*a* can move without moving the driving member 30, a resistance force for moving the driving member 30 is reduced, and the driving member 30 can be easily retracted. That is, when the opening and closing body 14 is closed, the lock device 10 can be easily locked, and operability can be improved. Since the first rod 24*a* moves separately from the driving member 30, rattling is likely to occur, but rattling is prevented by the coupling between the holding portion 64 and the coupling portion 50.

The holding portion 64 functions to prevent backlash of the first rod 24*a* by being coupled to the coupling portion 50. The holding portion 64 is located on an outer side in the width direction of the opening of the stationary body 12 from the tip end of the lock portion 60, that is, on a side end side of the stationary body 12 and on the rear end side of the first rod 24*a*. That is, the tip end of the lock portion 60 is located closer to the center of the first rod 24*a* than the holding portion 64. Since the holding portion 64 is positioned on the rear end side in the longitudinal direction of the first rod 24*a* with respect to the lock portion 60, it is possible to prevent backlash on the end portion side of the first rod 24*a*, and it is possible to prevent occurrence of rattling when the lock portion 60 comes into contact with the opening and closing body 14. The holding portion 64 is located closer to the operation member 22 than the tip end of the lock portion 60. The operation member 22 is positioned at an end portion side in a width direction (a vehicle left-right direction) of the opening and closing body 14, and is positioned at one end side in the lock device 10. That is, the holding portion 64 is positioned at an end portion of the lock device 10 from the tip end of the lock portion 60, and can prevent backlash of the end portion of the first rod 24*a*.

The holding portion 64 is located between the lock portion 60 and the receiving portion 62 in the moving direction (longitudinal direction) of the first rod 24*a*. That is, the holding portion 64 is located at a position closer to the receiving portion 62 side than the lock portion 60 and closer to the base member 20, that is, on the end portion side of the first rod 24*a*, so that it is possible to prevent backlash on the end portion side of the first rod 24*a*.

In the longitudinal direction of the first rod 24*a*, a length of the holding portion 64 is longer than a length by which the lock portion 60 enters the lock hole 14*a*. As a result, when the lock device 10 is attached, the lock portion 60 can be moved away to the outside of the lock hole 14*a* with a margin, so that the attachment work can be easily performed.

Figure 5B:
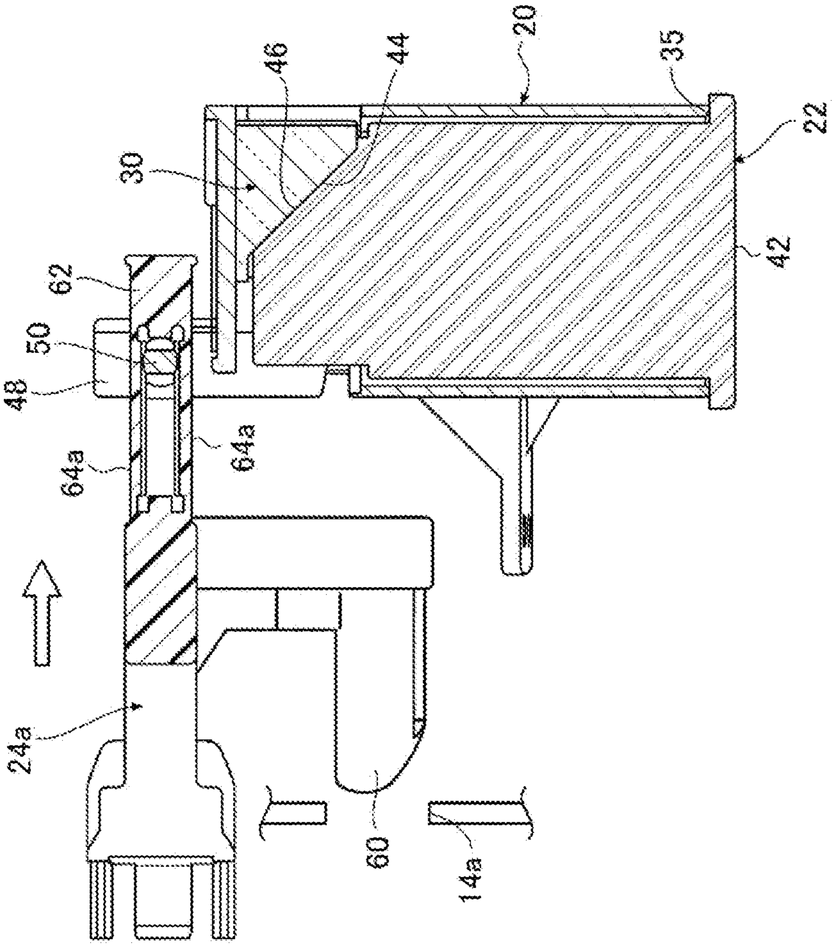
FIGS. 5A and 5B are views illustrating the lock device in a state in which a lock is released by an operation of a user.
Figure 5A:
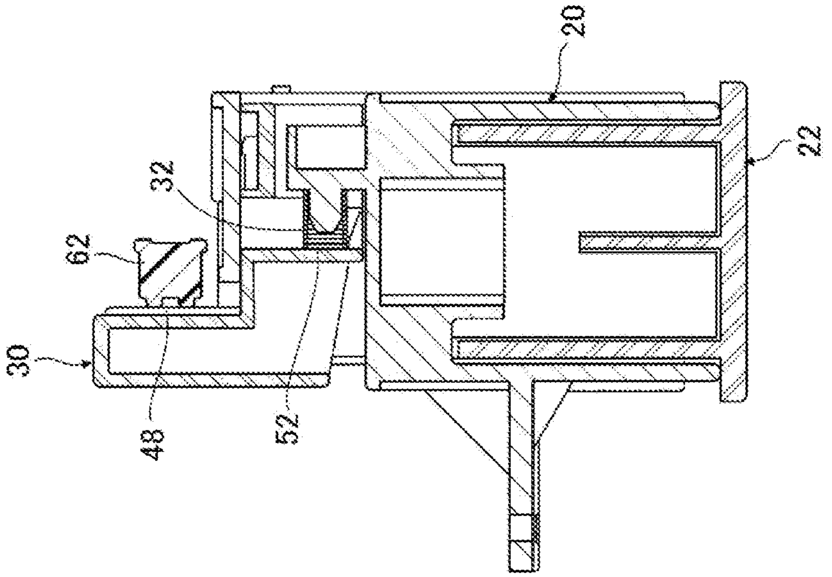

FIGS. 5A and 5B are views illustrating the lock device 10 in a state in which the lock is released by an operation of a user. FIG. 5A is a cross-sectional view taken along the line A-A of the lock device 10 shown in FIG. 2A, and FIG. 5B is a cross-sectional view taken along the line B-B of the lock device 10 shown in FIG. 2A.

Compared to the operation member 22 shown in FIG. 3A, the operation member 22 shown in FIG. 5A is in a state in which the operation member 22 is slid and pushed toward the back side of the base member 20 by the push operation of the user, and the driving member 30 is retracted in the lock releasing direction. The driving member 30 retreats against the spring member 32, and the contact portion 48 retreats the receiving portion 62 of the first rod 24*a*.

As shown in FIG. 3B 5B, the pushing portion 44 of the operation member 22 pushes the sliding surface 46 of the driving member 30, and the driving member 30 is retracted. In this way, the driving member 30 is driven by an operation of the user.

By the sliding of the driving member 30, the first rod 24*a* is retracted in the lock releasing direction, and as shown in FIG. 5B, the lock portion 60 is released from the lock hole 14*a*. In this way, when the first rod 24*a* is moved in the lock releasing direction by the driving of the driving member 30 in response to the movement of the operation member 22, the holding portion 64 and the coupling portion 50 move in the lock releasing direction. As a result, since the holding portion 64 and the coupling portion 50 move together, frictional resistance between the holding portion 64 and the coupling portion 50 can be prevented, and an operation force of the push operation by the user can be reduced.

Figure 6:
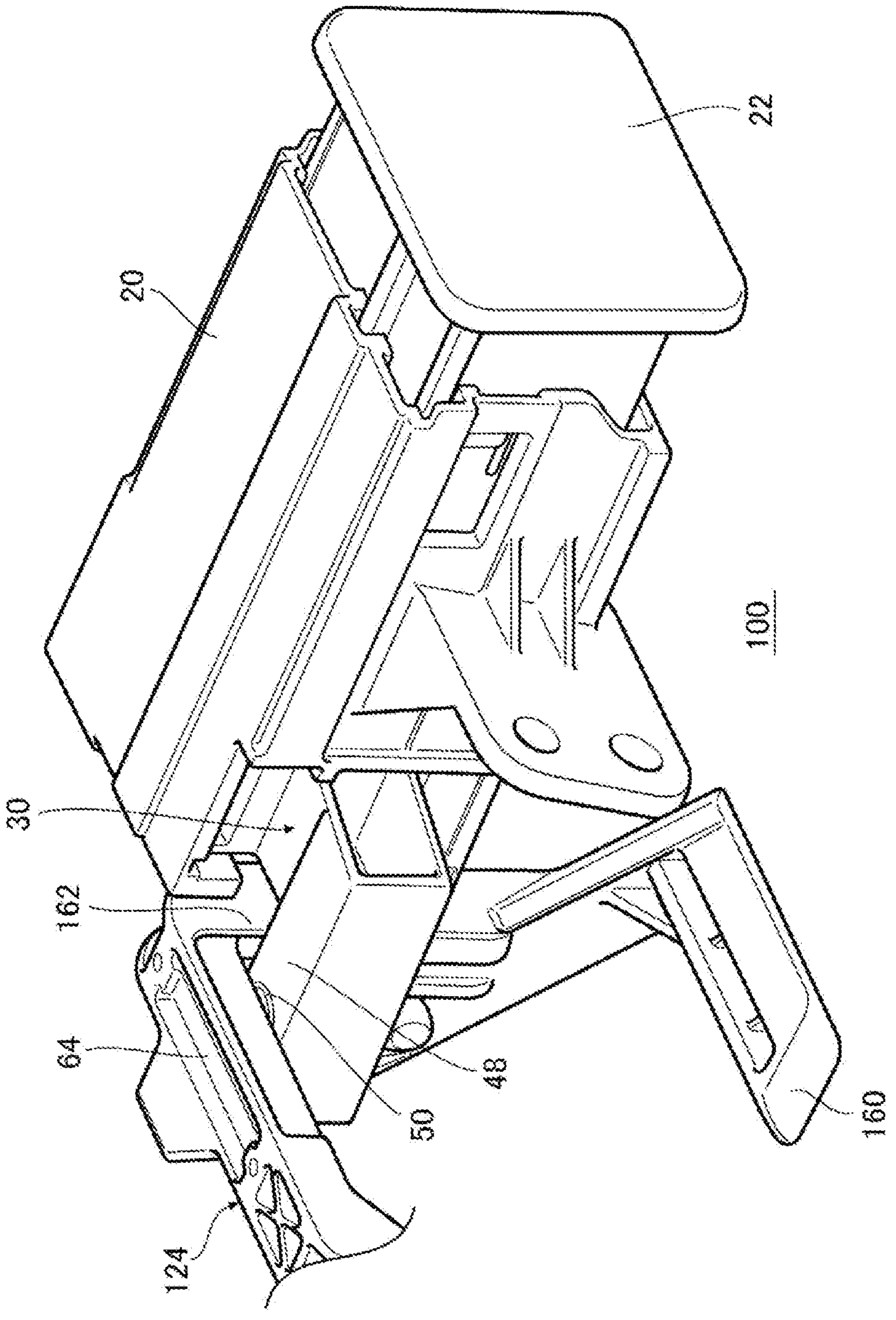
FIG. 6 is a partial perspective view of a lock device according to a first modification.

FIG. 6 is a partial perspective view of a lock device 100 according to a first modification. The lock device 100 according to the first modification is different from the lock device 10 shown in FIG. 3B in the arrangement of a lock portion 160 and a receiving portion 162.

A rod 124 includes the lock portion 160, the receiving portion 162, and the holding portion 64. The receiving portion 162 is bent from a rear end portion of the rod 124 in a direction orthogonal to the longitudinal direction. The lock portion 160 is bent from the receiving portion 162 and extends parallel to the longitudinal direction of the rod 124. The holding portion 64 is located between the receiving portion 162 and a tip end of the lock portion 160. In the lock device 100 according to the first modification, the holding portion 64 of the rod 124 and the coupling portion 50 of the driving member 30 are slidably coupled to each other. Accordingly, when the operation member 22 receives the push operation, the driving member 30 and the rod 124 move backward together, and when the opening and closing body 14 is closed, only the rod 124 moves backward.

Figure 7B:
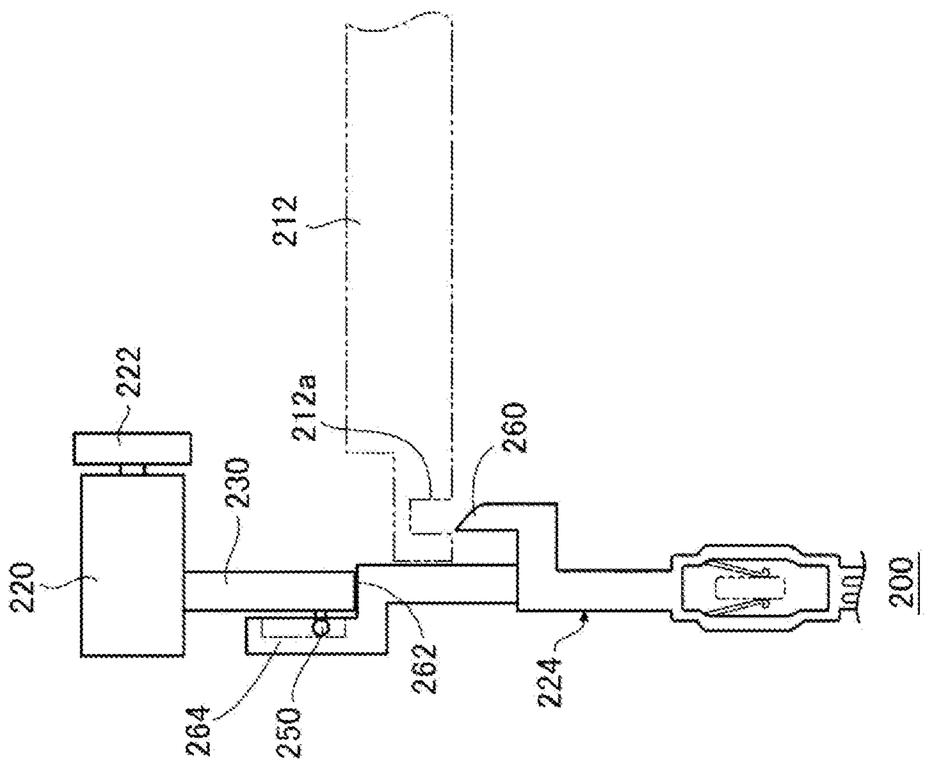
FIGS. 7A and 7B are views illustrating a lock device according to a second modification.
Figure 7A:
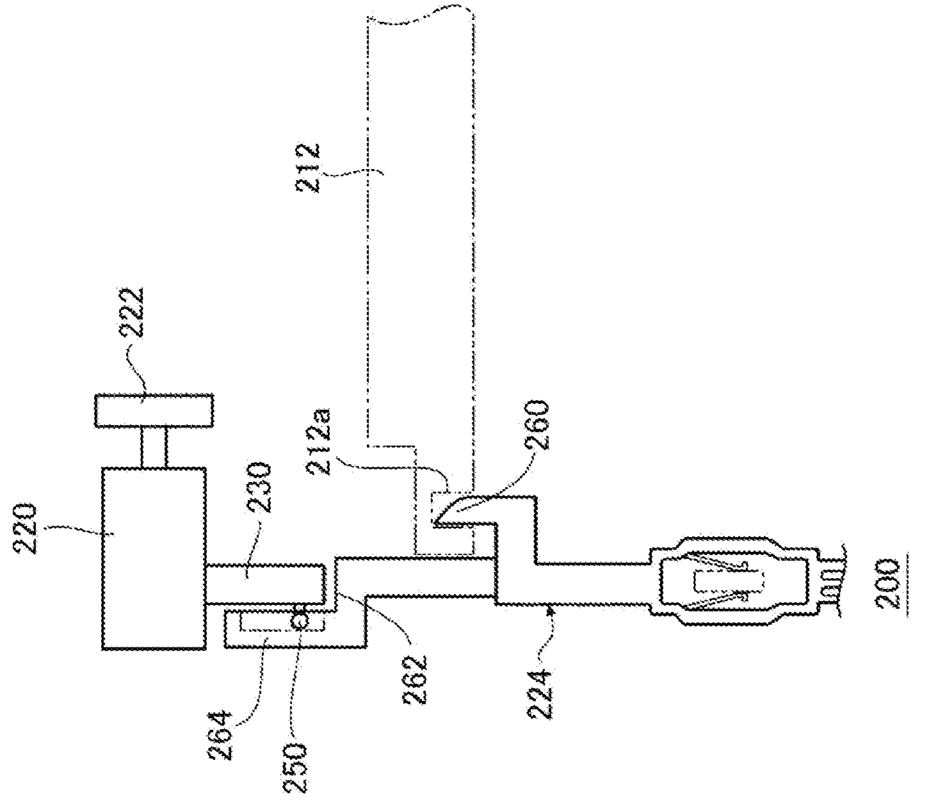

FIGS. 7A and 7B are views illustrating a lock device 200 according to a second modification. In the locking device 200 illustrated in FIG. 7A, a locking direction and a lock releasing direction of a lock portion 260 are opposite to those of the lock device 10 illustrated in FIG. 3B, and a sliding direction of the driving member 230 during an operation of a user is also opposite to that in the lock device 10 illustrated in FIG. 3B.

As illustrated in FIG. 7A, a base member 220 of the lock device 200 slidably supports an operation member 222 and the driving member 230. The driving member 230 and a rod 224 are slidably coupled by a coupling portion 250 of the driving member 230 and a holding portion 264 of the rod 224. The holding portion 264 is located closer to a rear end portion side of the rod 224 than the lock portion 260 and a receiving portion 262. As a result, the end portion side of the rod 224 can be prevented from rattling.

The receiving portion 262 of the rod 224 is located between the lock portion 260 and the holding portion 264. An extending direction of the lock portion 260 is opposite to that of the lock portion 60 of the lock device 10 shown in FIG. 3B. As shown in FIG. 7B, when the operation member 222 receives a push operation by the user, the driving member 230 slides in conjunction with the push operation, and the driving member 230 moves the rod 224 in the lock releasing direction.

The present invention is not limited to the embodiment described above and modifications such as various design changes can be added to the embodiment based on knowledge of a person skilled in the art. Embodiments to which such modifications are added can also be included in the scope of the present invention.

For example, in the embodiment, a mode in which the driving member 30 slides is shown, but the present invention is not limited to this mode, and a mode in which the driving member 30 rotates may be adopted. In this mode, the driving member 30 may be rotatably supported by the base member 20, and may be rotated by the operation member 22, and the first rod 24*a* may be moved in the lock releasing direction by the rotation of the driving member 30.

INDUSTRIAL APPLICABILITY

The present invention relates to a lock device capable of locking an opening and closing body, which can open and close an opening of a stationary body, in a closed state.

REFERENCE SIGNS LIST

1 glove box
10 lock device
12 stationary body
14*a* lock hole
14 opening and closing body
20 base member
22 operation member
24*a* first rod
24*b* second rod
26 holding member
28 rotor member
30 driving member
32 spring member
34 accommodation portion
35 insertion hole
36 attachment portion
38 first guide portion
39 second guide portion
40 retaining portion
42 operation input portion
44 pushing portion
46 sliding surface
48 contact portion
50 coupling portion
52 spring receiving portion
54 first engaging portion
56 second engaging portion
60 lock portion
62 receiving portion
64 holding portion

The invention claimed is:

1. A lock device attached to a stationary body having an opening so that an opening and closing body configured to open and close the opening is locked in a closed state with respect to the stationary body, the lock device comprising:

a driving member configured to be driven in response to movement of an operation member receiving an operation of a user; and a rod configured to be movable in a longitudinal direction, wherein the driving member includes a coupling portion coupled to the rod, wherein the rod includes:

a lock portion configured to be engageable with and disengageable from a lock hole of the opening and closing body; and a holding portion holding the coupling portion so that the coupling portion is slidable in a moving direction of the rod, wherein when the rod is moved in a lock releasing direction in which lock of the lock portion is released by driving of the driving member in response to the operation of the user, the holding portion and the coupling portion are configured to move in the lock releasing direction, and wherein the holding portion is configured to slide with respect to the corresponding coupling portion while maintaining direct contact with the corresponding coupling portion.

2. The lock device according to claim 1, wherein when the lock portion comes into contact with the opening and closing body and moves in the lock releasing direction in closing the opening and closing body, the holding portion is configured to slide with respect to the corresponding coupling portion while maintaining contact with the corresponding coupling portion.

3. The lock device according to claim 1, wherein the holding portion is located on an end portion side of the rod from a tip end of the lock portion in a longitudinal direction of the rod.

4. The lock device according to claim 1, wherein the rod includes a receiving portion configured to receive an input from the driving member, and the holding portion is located between the lock portion and the receiving portion in a moving direction of the rod.

5. A lock device attached to a stationary body having an opening so that an opening and closing body configured to open and close the opening is locked in a closed state with respect to the stationary body, the lock device comprising:

a driving member configured to be driven in response to movement of an operation member receiving an operation of a user; and a rod configured to be movable in a longitudinal direction, wherein the driving member includes a coupling portion coupled to the rod, wherein the rod includes:

a lock portion configured to be engageable with and disengageable from a lock hole of the opening and closing body; and a holding portion holding the coupling portion so that the coupling portion is slidable in a moving direction of the rod, wherein when the rod is moved in a lock releasing direction in which lock of the lock portion is released by driving of the driving member in response to the operation of the user, the holding portion and the coupling portion are configured to move in the lock releasing direction, wherein the holding portion is configured to slide with respect to the corresponding coupling portion in a state of being coupled to the corresponding coupling portion, and wherein the lock portion protrudes from the rod in a direction different from a moving direction of the rod.

* * * * *